United States Patent
Martinez et al.

(10) Patent No.: US 9,026,468 B2
(45) Date of Patent: May 5, 2015

(54) SYSTEM AND METHOD FOR PROACTIVELY ESTABLISHING A THIRD-PARTY PAYMENT ACCOUNT FOR SERVICES RENDERED TO A RESIDENT OF A CONTROLLED-ENVIRONMENT FACILITY

(75) Inventors: Veronica Martinez, Irving, TX (US); Marc Hite, Plano, TX (US); Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 1500 days.

(21) Appl. No.: 12/042,861

(22) Filed: Mar. 5, 2008

(65) Prior Publication Data
US 2009/0228383 A1 Sep. 10, 2009

(51) Int. Cl.
*G06Q 40/00* (2012.01)
*G06Q 30/06* (2012.01)
(Continued)

(52) U.S. Cl.
CPC .......... *G06Q 30/06* (2013.01); *G06Q 30/04* (2013.01); *G06Q 40/00* (2013.01); *G06Q 50/26* (2013.01); *G06Q 50/32* (2013.01)

(58) Field of Classification Search
USPC .............. 705/35; 707/1; 379/114.13, 114.14, 379/114.21, 114.23, 133, 191, 309; 600/300, 595
See application file for complete search history.

(56) References Cited

U.S. PATENT DOCUMENTS

| 4,935,956 A | 6/1990 | Hellwarth et al. |
| 4,993,062 A | 2/1991 | Dula et al. |

(Continued)

FOREIGN PATENT DOCUMENTS

| EP | 1 175 074 A2 | 1/2002 |
| JP | 8077479 | 3/1996 |

(Continued)

OTHER PUBLICATIONS

International Search Report for European Patent Application No. 07252653.6 based on U.S. Appl. No. 11/0480,264, "Systems and Methods for Account Management Using Interrupt Messaging," Evercom Systems, Inc., Mar. 3, 2008, 12 pages.
(Continued)

*Primary Examiner* — James Trammell
*Assistant Examiner* — Sanjeev Malhotra
(74) *Attorney, Agent, or Firm* — Fogarty, L.L.C.

(57) ABSTRACT

Systems and methods for proactively establishing a third-party payment account for services rendered to a resident of a controlled-environment facility ("CEF"). A campaign-triggering event is detected, which triggers contact of prospective third-party ("$3^{rd}$-party") payers for a resident of a CEF in order to encourage such prospective $3^{rd}$-party payers to establish $3^{rd}$-party payment accounts for the resident. In this manner, the prospective $3^{rd}$-party payers are proactively contacted prior to an expected future demand for service by the resident. A method thus comprises identifying at least one prospective third-party payer for a resident of a controlled-environment facility, and proactively contacting the identified at least one prospective third-party payer prior to demand for service by the resident to encourage the identified at least one prospective third-party payer to establish a third-party payment account for payment for future service expected for the resident.

10 Claims, 3 Drawing Sheets

(51) Int. Cl.
  *G06Q 30/04* (2012.01)
  *G06Q 50/26* (2012.01)
  *G06Q 50/32* (2012.01)

(56) References Cited

U.S. PATENT DOCUMENTS

| | | | |
|---|---|---|---|
| 5,185,781 A | 2/1993 | Dowden et al. | |
| 5,210,789 A | 5/1993 | Jeffus et al. | |
| 5,247,569 A | 9/1993 | Cave | |
| 5,255,305 A | 10/1993 | Sattar | |
| 5,345,501 A | 9/1994 | Shelton | |
| 5,485,507 A | 1/1996 | Brown et al. | |
| 5,517,555 A | 5/1996 | Amadon et al. | |
| 5,627,887 A | 5/1997 | Freedman | |
| 5,655,013 A | 8/1997 | Gainsboro | |
| 5,832,068 A * | 11/1998 | Smith | 379/114.14 |
| 5,859,902 A | 1/1999 | Freedman | |
| 5,875,236 A | 2/1999 | Jankowitz et al. | |
| 5,937,044 A | 8/1999 | Kim | |
| 5,963,635 A * | 10/1999 | Szlam et al. | 379/309 |
| 6,052,454 A | 4/2000 | Kek et al. | |
| 6,078,892 A | 6/2000 | Anderson et al. | |
| 6,173,284 B1 | 1/2001 | Brown | |
| 6,175,831 B1 | 1/2001 | Weinreich et al. | |
| 6,308,171 B1 | 10/2001 | De La Huerga | |
| 6,320,946 B1 | 11/2001 | Enzmann et al. | |
| 6,320,948 B1 | 11/2001 | Heilmann et al. | |
| 6,324,280 B2 | 11/2001 | Dunn et al. | |
| 6,327,345 B1 | 12/2001 | Jordan | |
| 6,330,546 B1 | 12/2001 | Gopinathan et al. | |
| 6,363,065 B1 | 3/2002 | Thornton et al. | |
| 6,396,915 B1 | 5/2002 | Springer et al. | |
| 6,404,764 B1 | 6/2002 | Jones et al. | |
| 6,404,857 B1 | 6/2002 | Blair et al. | |
| 6,480,590 B1 | 11/2002 | Ku | |
| 6,487,200 B1 | 11/2002 | Fraser | |
| 6,513,119 B1 | 1/2003 | Wenzel | |
| 6,516,056 B1 | 2/2003 | Justice et al. | |
| 6,553,336 B1 | 4/2003 | Johnson et al. | |
| 6,636,591 B1 | 10/2003 | Swope et al. | |
| 6,639,977 B1 | 10/2003 | Swope et al. | |
| 6,639,978 B2 | 10/2003 | Draizin et al. | |
| 6,658,393 B1 | 12/2003 | Basch et al. | |
| 6,668,045 B1 | 12/2003 | Mow | |
| 6,836,540 B2 | 12/2004 | Falcone et al. | |
| 6,920,209 B1 | 7/2005 | Gainsboro | |
| 6,947,532 B1 | 9/2005 | Marchand et al. | |
| 6,976,032 B1 | 12/2005 | Hull et al. | |
| 6,985,478 B2 | 1/2006 | Pogossiants et al. | |
| 7,039,171 B2 | 5/2006 | Gickler | |
| 7,042,992 B1 * | 5/2006 | Falcone et al. | 379/114.21 |
| 7,075,919 B1 | 7/2006 | Wendt et al. | |
| 7,079,636 B1 | 7/2006 | McNitt et al. | |
| 7,079,637 B1 | 7/2006 | McNitt et al. | |
| 7,106,843 B1 * | 9/2006 | Gainsboro et al. | 379/191 |
| 7,158,621 B2 * | 1/2007 | Bayne | 379/114.13 |
| 7,188,360 B2 | 3/2007 | Gerdes et al. | |
| 7,256,816 B2 | 8/2007 | Profanchik et al. | |
| 7,333,798 B2 | 2/2008 | Hodge | |
| 7,377,426 B1 | 5/2008 | Makeever | |
| 7,492,881 B1 * | 2/2009 | Hite et al. | 379/114.23 |
| 2001/0036821 A1 | 11/2001 | Gainsboro et al. | |
| 2002/0069084 A1 | 6/2002 | Donovan | |
| 2002/0176403 A1 | 11/2002 | Radian | |
| 2002/0184103 A1 | 12/2002 | Shah et al. | |
| 2002/0191762 A1 * | 12/2002 | Benson | 379/133 |
| 2002/0194096 A1 * | 12/2002 | Falcone et al. | 705/35 |
| 2002/0194113 A1 | 12/2002 | Lof et al. | |
| 2003/0002639 A1 | 1/2003 | Huie | |
| 2003/0041050 A1 * | 2/2003 | Smith et al. | 707/1 |
| 2003/0046208 A1 | 3/2003 | Lubking et al. | |
| 2003/0070076 A1 | 4/2003 | Michael | |
| 2003/0086546 A1 * | 5/2003 | Falcone et al. | 379/114.21 |
| 2003/0112936 A1 | 6/2003 | Brown et al. | |
| 2003/0126470 A1 | 7/2003 | Crites et al. | |
| 2003/0151761 A1 | 8/2003 | Burns | |
| 2003/0185204 A1 | 10/2003 | Murdock | |
| 2003/0200182 A1 | 10/2003 | Truitt et al. | |
| 2004/0052218 A1 | 3/2004 | Knappe | |
| 2004/0078328 A1 | 4/2004 | Talbert et al. | |
| 2004/0229569 A1 | 11/2004 | Franz | |
| 2005/0114192 A1 | 5/2005 | Tor et al. | |
| 2005/0125321 A1 * | 6/2005 | Gerstner et al. | 705/35 |
| 2005/0284931 A1 | 12/2005 | Adams et al. | |
| 2006/0252999 A1 * | 11/2006 | Devaul et al. | 600/300 |
| 2006/0282021 A1 * | 12/2006 | DeVaul et al. | 600/595 |

FOREIGN PATENT DOCUMENTS

| | | |
|---|---|---|
| JP | 2002-157627 | 5/2002 |
| JP | 2003-110758 | 4/2003 |
| WO | WO 98/23062 A1 | 5/1998 |
| WO | WO 03/052741 A1 | 6/2003 |

OTHER PUBLICATIONS

Federal Prisoner Health Care Copayment Act of 2000, House of Representatives Report 106-851, 106th Congress 2d Session, Sep. 14, 2000, 26 pages.

European Search Report for European Patent Application No. 07252651.0, Apr. 4, 2008, 6 pages.

International Search Report and Written Opinion of the International Searching Authority for International Application No. PCT/US07/72558, Jun. 17, 2008, 7 pages.

IMAGIS Technologies, Inc., "Computerized Arrest and Booking System," http://www.imagistechnologies.com/Product/CABS.htm, Nov. 5, 2002, 5 pages.

IMAGIS Technologies, Inc. "Integrated Justice System—Web based Image and Data Sharing," http://www.imagistechnologies.com/Product/IJISFramework.htm, Nov. 5, 2002, 4 pages.

i2 Investigative Analysis Software; "ChartReader," URL: http://www.i2.co.uk/Products Chart Reader/, Jun. 13, 2005, 1 page.

i2 Investigative Analysis Software; "iBase-Information Captured," URL: http://www.i2.co.uk/Products/iBase/, Jun. 13, 2005, 2 pages.

i2 Investigative Analysis Software; "iBridge," URL: http://www.i2.co.uk/Products/iBridge/. Jun. 13, 2005, 1 page.

i2 Investigative Analysis Software; "i2 TextChart:Text Visualized," URL: http://www.i2.co.uk/Products/i2TextChart/. Jun. 13, 2005, 2 pages.

i2 Investigative Analysis Software; "Pattern Tracer," URL: http://www.i2.co.uk/Products/Pattern Tracer/. Jun. 13, 2005, 1 page.

i2 Investigative Analysis Software; "Prisons," URL: http://www.i2.co.uk/Solutions/Prisons/default.asap. Jun. 13, 2005, 1 page.

i2 Investigative Analysis Software; "Setting International Standards for Investigative Analysis," URL: http://www.i2.co.uk/Products/index.htm, Jun. 13, 2005, 1 page.

Microsoft: "Integrated Justice Information Systems (IJIS): An Overview," Microsoft Justice & Public Safety Solutions Nov. 5, 2002 http://jps.directtaps.net/_vti_bin/owssvrdll?Using=Default%2ehtm, 22 pages.

O'Harrow, R., Jr., "Database will make tracking suspected terrorists easier," The Dallas Morning News, Dallas, TX, Aug. 6, 2003. p. 7A.

O'Harrow, R., Jr.,"U.S. Backs Florida's New Counterterrorism Database; 'Matrix' Offers Law Angencies Faster Access to Americans' Personal Records:[Final Edition]," The Washington Post, Washington, D.C., Aug. 6, 2003, p. A. 01.

Chau,M., et al., "Building an Infrastructure for Law Enforcement Information Sharing and Collaboration: Design Issues and Challenges," 2001, 6 pages.

Hauck, R.V., et al., "Coplink: A Case of Intelligent Analysis and Knowledge Management," Dec. 1999, pp. 15-29.

Fischer, A.D., et al., "COPLINK nabs criminals faster," Arizona Daily Star, Jan. 7, 2001, pp. 1-5.

"BubbleLINK® Software Architecture," SciDyn™, The Voice of IP Technology™, Nov. 4, 2005, 10 pages, http://www.scidyn.com/products/BubbleLink%20White.pdf.

"Call Control—Commander II:," SciDyn™ Products, Nov. 4, 2005, 3 pages, http://www.scidyn.com/products/commander2.html.

(56) References Cited

OTHER PUBLICATIONS

"ShoreTel—Intelligent Phone Systems," ShoreTel, Nov. 4, 2005, 4 pages, http://www.shoretel.com/STCorp/products/architecture.aspx.

"SciDyn VoIP Technology Now Available for Call Control Solutions," SciDyn™ Press Release, Nov. 4, 2005, 2 pages.

"Smart Features for Opimizing Your Network," SciDyn™ BubbleLINK®, Nov. 4, 2005, 2 pages, http://www.scidyn.com/products/bubble.html.

Swope, B., et al., U.S. Appl. No. 09/640,831, "System and Method for Reverse Billing for Telephone Call," filed Aug. 17, 2000.

Lord, M., U.S. Appl. No. 09/995,253, "Method and Apparatus for Exchanging Data Between a Primary Computer System and an External Computer System to Ensure Transactional Reconciliation Between the Systems," filed Nov. 27, 2001.

Draizin, N., et al., U.S. Appl. No. 10/022,946, "A Method for Determining an Entity Responsible for Billing a Called Party," filed Dec. 17, 2001.

Viola, J., et al., U.S. Appl. No. 10/135,878, "Information Management and Movement System and Method," filed Apr. 29, 2002.

Falcone, R., et al., U.S. Appl. No. 10/135,883, "Optimizing Profitability in Business Transactions," filed Apr. 29, 2002.

Falcone, R., et al., U.S. Appl. No. 10/190,315, "Systems and Methods for Offering a Service to a Party Associated with a Blocked Call," filed Jul. 3, 2002.

Mudd, R., et al., U.S. Appl. No. 10/217,149, "System and Method of Call Treatment," filed Aug. 12, 2002.

Lord, M., U.S. Appl. No. 10/252,956, "Three-Way Telephone Call Prevention System and Method," filed Sep. 20, 2002.

Falcone, R., et al., U.S. Appl. No. 10/360,248, "Systems and Methods for Account Establishment and Transaction Management Using Interrupt Messaging," filed Feb. 7, 2003.

Falcone, R., et al., U.S. Appl. No. 10/360,442, "Systems and Methods for Transaction Authorization Determination," filed Feb. 7, 2003.

Hite, M., et al., U.S. Appl. No. 10/437,839, "Intelligent Queuing of Transaction Records," filed May 14, 2003.

Sullivan, R. et al., U.S. Appl. No. 10/602,233, "Systems and Methods for Transaction and Information Management," filed Jun. 24, 2003.

Rae, R., U.S. Appl. No. 10/642,532, "Centralized Call Processing," filed Aug. 15, 2003.

Viola, J., et al., U.S. Appl. No. 10/720,732, "Information Management and Movement System and Method," filed Nov. 24, 2003.

Viola, J., et al., U.S. Appl. No. 10/720,848, "Information Management and Movement System and Method," filed Nov. 24, 2003.

Rae, et al., U.S. Appl. No. 10/800,473, "Centralized Call Processing," filed Mar. 15, 2004.

Rosenfield, S., et al., U.S. Appl. No. 10/836,976, "Systems and Methods for Transaction and Information Management," filed Apr. 30, 2004.

Davis, M., et al., U.S. Appl. No. 10/947,986, "Optimizing Profitability in Business Transactions," filed Sep. 23, 2004.

Hingoranee, R., et al., U.S. Appl. No. 10/952,327, "Systems and Methods for Management and Dissemination of Information from a Controlled Environment Facility," filed Sep. 28, 2004.

Keiser, L., et al., U.S. Appl. No. 11/125,842, "Processor-based Selfservice Terminals Used with Respect to Controlled Environment Facilities," filed May 10, 2005.

Sidler, J., et al., U.S. Appl. No. 11/182,625, "Systems and Methods for Acquiring, Accessing, and Analyzing Investigative Information," filed Jul. 15, 2005.

Falcone, R., et al., U.S. Appl. No. 11/386,032, "Systems and Methods for Account Management Using Interrupt Messaging," filed Mar. 21, 2006.

Polozola, M., U.S. Appl. No. 11/386,056, "Management of Provision of Services Based at least in Part Information About a Payor's Utility," filed Mar. 21, 2006.

* cited by examiner

SYSTEM AND METHOD FOR PROACTIVELY ESTABLISHING A THIRD-PARTY PAYMENT ACCOUNT FOR SERVICES RENDERED TO A RESIDENT OF A CONTROLLED-ENVIRONMENT FACILITY

CROSS-REFERENCE TO RELATED APPLICATIONS

This application is related to co-pending U.S. patent application Ser. No. 11/480,264 titled "SYSTEMS AND METHODS FOR ACCOUNT ESTABLISHMENT AND TRANSACTION MANAGEMENT" filed Jun. 30, 2006, which is a continuation-in-part of co-pending U.S. patent application Ser. No. 11/386,032 titled "SYSTEMS AND METHODS FOR ACCOUNT MANAGEMENT USING INTERRUPT MESSAGE" filed Mar. 21, 2006, which is a continuation-in-part of co-pending U.S. patent application Ser. No. 10/360,248 titled "SYSTEMS AND METHODS FOR ACCOUNT ESTABLISHMENT AND TRANSACTION MANAGEMENT USING INTERRUPT MESSAGING" filed Feb. 7, 2003, the disclosures of which are hereby incorporated herein by reference.

The present application is also related to co-pending and commonly assigned United States Patent Applications: Ser. No. 10/360,442 filed Feb. 7, 2003 titled "SYSTEMS AND METHODS FOR TRANSACTION AUTHORIZATION DETERMINATION;" Ser. No. 10/135,883 (now Published Application No. 2002/0194096) filed Apr. 29, 2002 titled "OPTIMIZING PROFITABILITY IN BUSINESS TRANSACTIONS;" Ser. No. 10/135,878 filed Apr. 29, 2002 titled "INFORMATION MANAGEMENT AND MOVEMENT SYSTEM AND METHOD;" Ser. No. 11/386,056 filed Mar. 21, 2006 titled "MANAGEMENT OF PROVISION OF SERVICES BASED AT LEAST IN PART ON INFORMATION ABOUT A PAYOR'S UTILITY;" Ser. No. 11/480,259 filed Jun. 30, 2006 titled "SYSTEM AND METHOD FOR ELECTRONIC VISITATION REGISTRATION;" Ser. No. 10/720,732 filed Nov. 24, 2003 titled "INFORMATION MANAGEMENT AND MOVEMENT SYSTEM AND METHOD;" Ser. No. 10/720,848 filed Nov. 24, 2003 titled "INFORMATION MANAGEMENT AND MOVEMENT SYSTEM AND METHOD;" Ser. No. 11/125,842 filed May 10, 2005 titled "PROCESSOR-BASED SELF-SERVICE TERMINALS USED WITH RESPECT TO CONTROLLED ENVIRONMENT FACILITIES;" Ser. No. 10/642,532 filed Aug. 15, 2003 titled "CENTRALIZED CALL PROCESSING;" Ser. No. 10/800,473 filed Mar. 15, 2004 titled "CALL PROCESSING WITH VOICE OVER INTERNET PROTOCOL TRANSMISSION;" Ser. No. 10/602,233 filed Jun. 24, 2003 titled "SYSTEMS AND METHODS FOR TRANSACTION AND INFORMATION MANAGEMENT;" and Ser. No. 10/836,976 filed Apr. 30, 2004 titled "SYSTEMS AND METHODS FOR TRANSACTION AND INFORMATION MANAGEMENT," the disclosures of which are hereby incorporated herein by reference.

The present application is also related to commonly assigned U.S. Pat. No. 6,639,978 titled "Method for Determining an Entity Responsible for Billing a Called Party," which issued from an application filed Dec. 17, 2001, the disclosure of which is also hereby incorporated herein by reference.

TECHNICAL FIELD

The following description relates generally to establishment of payment accounts, and more particularly to systems and methods for proactively establishing third-party payment accounts for payment for services, such as telecommunication services, rendered to a resident of a controlled-environment facility, such as a prison facility.

BACKGROUND OF THE INVENTION

Various types of controlled-environment facilities are present in today's society, and persons may be voluntary or involuntary residents of such controlled-environment facilities temporarily or permanently. Examples of such controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents.

Various services are commonly rendered to residents of controlled-environment facilities, such as provision of telephony and/or other communication services, provision of information access (e.g., Internet access), provision of consumer goods (e.g., commissary items), etc. Many of such services are provided at a fee. That is, the facility and/or provider of such service may charge a fee for the provision of such services to a resident.

Third parties are often relied upon for payment of any such fees charged. For instance, the residents of a controlled-environment facility may not have funds readily accessible to them, and therefore third parties may be relied upon to pay for services rendered to the residents. In some instances, the third-party payer may be a party to the service provided to a resident, such as when the third party pays for telephony charges incurred for a call from the resident to the third party. In other instances, the third-party payer may not be a party to the service rendered to the resident, such as when the resident purchases a commissary item within the controlled-environment facility using funds of the third-party payer.

As discussed further below, various types of payment accounts (or "billing arrangements") may be established with a third-party payer for payment for services rendered to a resident of a controlled-environment facility. A given third-party payment account may be a pre-funded (or "prepaid") account, or some other type of billing arrangement. In some instances, a type of payment account that is acceptable to the service provider may be determined at least in part on a determined risk score for the third-party payer and/or the resident of the controlled-environment facility. Such risk score may be determined based on various factors, such as described in co-pending U.S. patent application Ser. No. 11/480,264 titled "SYSTEMS AND METHODS FOR ACCOUNT ESTABLISHMENT AND TRANSACTION MANAGEMENT" filed Jun. 30, 2006, which is a continuation-in-part of co-pending U.S. patent application Ser. No. 11/386,032 titled "SYSTEMS AND METHODS FOR ACCOUNT MANAGEMENT USING INTERRUPT MESSAGE" filed Mar. 21, 2006, which is a continuation-in-part of co-pending U.S. patent application Ser. No. 10/360,248 titled "SYSTEMS AND METHODS FOR ACCOUNT ESTABLISHMENT AND TRANSACTION MANAGEMENT USING INTERRUPT MESSAGING" filed Feb. 7, 2003, and/or as described in co-pending and commonly assigned United State Patent Applications: Ser. No. 10/360,442 filed Feb. 7, 2003 titled "SYSTEMS AND METHODS FOR TRANSACTION AUTHORIZATION DETERMINATION;" Ser. No. 11/386,056 filed Mar. 21, 2006 titled "MANAGEMENT OF PROVISION OF SERVICES BASED AT LEAST IN PART ON INFORMATION ABOUT A PAYOR'S UTILITY," the disclosures of which are incorporated herein by reference.

The generation of revenue and profit is the driving force behind most business models. To supplement the cash purchasing methods in today's credit-based society, most businesses depend on some form of credit or entitlement authorization mechanism allowing for customers to purchase products, services, or other such items without the immediate physical exchange of cash. Inherent in such business models is the reality that a percentage of parties who purchase on credit or entitlement authorizations may eventually not pay, thus diminishing the business' overall profitability.

In order to balance the risk of such losses against the benefits of maintaining credit entitlement systems, businesses go to great lengths in making credit worthiness or other transaction authorization/verification determinations (collectively referred to herein as "transaction authorization determinations"), such as requiring lengthy applications including a wealth of personal information, accessing databases storing information about the potential borrower, and the like. This process is typically relatively slow and often-times results in a poor transaction authorization determination. For example, in order to minimize losses associated with poor credit risks, a transaction authorization determination implemented according to many business models may error on the conservative side, thereby foregoing a transaction having a collectable debt situation associated therewith because of a lack of information or insufficient analysis of decision criteria.

One example of a business model that generally requires more immediate credit/authorization determinations is the telecommunication provider industry, and, more particularly, businesses that provide telecommunication services to controlled-environment facilities, such as prisons. Prisoners are generally given some form of access to telephones, but the calls must be paid for. Telephone calls made by prisoners are typically made collect, wherein the called party accepts charges for the call.

As with other credit/authorization systems, some of the collect calls may never be paid for by the called parties. In such circumstances, the telecommunication service provider fails to recover the costs of providing the call, which, in turn, causes a loss of profitability. Bad debt losses may sometimes reach into the tens of millions of dollars for each telecommunication service provider with the industry total well over $1 billion. To address the risk of loss on some of the attempted prison calls, telecommunication service providers sometimes obtain information on the called parties in order to establish a customer database for providing call verification/authorization. When a prisoner attempts to make a collect call, the call or transaction request goes through a validation process. The telecommunication service provider accesses its customer databases and may be able to determine (1) can this call be billed (i.e., is there a billing arrangement with the local exchange carrier ((LEC) or the called party), (2) if the destination number is already in the service provider's files, has the allotted credit limit been reached, and (3) has there been any information received from the LEC indicating that the called party has not been paying his/her telephone bills. Depending on the extensiveness of the service provider's internal resources, the service provider may not be able to determine all three of these validation criteria. If favorable information is retrieved for each of the available validation criteria, the call is completed.

Conversely, if the prisoner attempts to call a destination number that is not already in the customer database, or if negative information is retrieved from the validation process, the service provider typically blocks the call from being completed. While these blocked calls save the telecommunication provider from losses for unpaid calls, some of those blocked calls represent lost potential revenue and profit that the provider would have generated. Thus, the telecommunication provider often encounters conflicting desires of: 1) connecting as many calls as possible to maximize the provider's billings; and 2) guarding against connecting calls that will likely not be paid, in attempt to maximize the amount of collections obtained from the provider's billings.

Traditionally, one of at least three (3) different types of third-party payment accounts (or arrangements) is implemented for telephone calls made by prisoners: 1) LEC billing, 2) direct billing, and 3) prepaid accounts. Each of these types of third-party payment accounts is described briefly below.

In LEC billing, the prison's telecommunication service provider typically sends the collect call bill to the LEC that services the called number. Thus, the prison's telecommunication service provider relies upon the called party's LEC for billing the called party for the charges incurred by the called party for collect calls from a prisoner. LECs, such as, Southwestern Bell, Verizon, BellSouth, Ameritech, and the like generally maintain accurate billing, name, and address (BNA) information, and may be authorized to bill third-party-provided telecommunication services if billing arrangements exist. It should be noted that for purposes of this disclosure, LEC is intended to include not only local exchange carriers, but also competitive LECs (CLECs), inter-exchange carriers (IXCs), and the like. LECs typically bill on a thirty-day billing cycle (i.e., provide a post-pay system that bills each customer for the telephone activity that occurred over the preceding thirty days). As with every other credit transaction, some LEC customers may fail to pay their bills. When this happens, the LECs recover any costs for providing the prisoner's call directly from the prison telecommunication service provider. Thus, the prison telecommunication service provider carries all of the losses for the unpaid collect calls originating from the prison, which generally effects the provider's profit realization.

Moreover, because of the LECs' typical thirty-day billing cycle, the prison telecommunication provider may not become aware that the bill has become delinquent for a minimum of 120 days after the bill was originally sent to the LEC (LECs may not declare a particular bill uncollectable for 120 days or more in many circumstances). Thus, the service provider would not know to block further calls to that destination number for anywhere from four months to over a year. If calls continue to the delinquent destination number during that period, a substantial amount of revenue and profits would simply be lost.

Further, by its nature, the market segment of customers whom the prison telephony service provider bills includes individuals that have particularly high-risk credit. For instance, individuals in this market segment are very often transient, fraudulent, and/or otherwise untrustworthy. Certain steps may be taken by the prison's telephony service provider in attempt to evaluate the credit worthiness of the party to be billed (e.g., the party whom a prisoner is attempting to call collect). For instance, before connecting a requested collect call, the prison's telephony system may access a line information database (LIDB) that contains subscriber information for the called party, and the prison's telephony system may use information obtained from the LIDB to evaluate whether to connect the collect call to such called party.

Regardless of these measures, however, it is often difficult to ensure that the customer (e.g., called party of a collect call) will pay the bill. One reason for this difficulty is that oftentimes the calling party is in prison for only a limited period of time. Thus, the prison's telephony service provider has limited leverage over the billed party. That is, once the prisoner is released from prison, the prison's telephony service provider loses its ability to apply leverage to the called party by requiring that the called party pay its outstanding bill before allowing another call from the prisoner to such called party. Additionally, it is difficult to maintain visibility of the called party by the prison's telephony service provider so as to enforce such leverage (i.e., to require that the called party pay his/her outstanding bill before allowing the prisoner to connect to the called party again), as the called party can easily change his/her telephone service from one LEC to another.

In direct billing, the service provider bills the called party directly. That is, rather than using the called party's LEC for billing the called party for charges incurred for collect calls from a prisoner, the prison's telecommunication service provider may directly bill the called party for such charges. For example, in some instances, a called party's LEC may not have a billing arrangement with the prison telecommunication service provider, in which case the service provider may resort to billing the called party directly. Such direct billing provides the service provider with improved visibility of the called party. Such direct billing method alleviates the service provider's dependency on the LEC for billing, and provides the service provider better exposure to the called party and the called party's payment history for charges incurred for calls made by a prisoner to the called party. That is, the direct billing method may enable the service provider to better track whether a given called party has paid for previous charges incurred for calls made by a prisoner. Of course, such direct billing imposes certain burdens on the service provider, such as tasks associated with identifying the called party's billing address (e.g., by obtaining the BNA from the called party's LEC), generating a bill, sending the bill, initiating collections efforts if needed, etc.

As an example of a prepaid (or "pre-funded") account payment method, a prepaid account may be established for a called party, wherein calls placed by a prisoner to such called party can be charged (e.g., by the called party) against the prepaid account. That is, as a call is conducted, the charges for the call are decremented from the called party's prepaid account. Once depleted, the called party may be prompted to add additional funds to the account to permit the call to continue and/or to permit future calls. As another example of a prepaid account payment method, a prepaid account may be established for a given prisoner (which may be funded by friends and/or family of the prisoner), and the prisoner may charge calls made to any parties against the prisoner's prepaid account. In some instances, the prisoner's prepaid account may also be used for purchasing commissary goods and/or for obtaining other goods/services that may be available to the prisoner at a fee. Such prepaid account payment methods are generally the payment method having the least risk to the service provider because it ensures that the funds for a call are available to the service provider.

As described further herein, in many instances an opportunity to provide service to a resident of a controlled-environment facility may be perishable. For instance, as mentioned above, in many instances an inmate may only be detained in a prison facility for a relatively short period of time before being released (e.g., upon a posting of bail, etc.). Thus, while determination and establishment of an acceptable or preferred type of third-party payment account may be desirable to minimize the risk of loss to a service provider, it is often desirable to pre-establish such third-party payment accounts efficiently (e.g., before the resident demands the service) so as to avoid missed opportunities for business/revenue by the service provider.

BRIEF SUMMARY OF THE INVENTION

The present invention is directed to systems and methods for proactively establishing a third-party payment account for services rendered to a resident of a controlled-environment facility (CEF). According to certain embodiments of the present invention, a campaign-triggering event is detected, which triggers contact of prospective third-party ("$3^{rd}$-party") payers for a resident of a CEF in order to encourage such prospective $3^{rd}$-party payers to establish $3^{rd}$-party payment accounts for the resident. In this manner, the prospective $3^{rd}$-party payers are proactively contacted prior to an expected future demand for service by the resident.

As an example, upon an inmate being booked into a prison facility, prospective $3^{rd}$-party payers for the inmate may be determined and a campaign initiated to notify the prospective $3^{rd}$-party payers of the inmate's incarceration and encourage the $3^{rd}$-party payers to proactively establish a $3^{rd}$-party payment account for payment for certain expected services that may be desired by the inmate while incarcerated, such as telephony services. As described further herein, a "risk score" may be determined for the $3^{rd}$-party payer and acceptable and/or preferred payment account type(s) may be determined, wherein the campaign may encourage the $3^{rd}$-party payer to establish such an acceptable and/or preferred payment account type. In certain embodiments, incentives (e.g., discounted rates, added funds to the account, a number of free services, such as a free call) may be offered to the prospective $3^{rd}$-party payer to further entice the $3^{rd}$-party payer to proactively establish an acceptable and/or preferred $3^{rd}$-party payment account type.

Today, the establishment of $3^{rd}$-party payment accounts for residents of CEFs is undesirably slow and/or inefficient in many cases, which may lead to delay of provision of services to the residents and/or lost business opportunities to a service provider. For example, in a typical prison facility, when an inmate is initially arrested and booked into the facility, the inmate is placed in a holding cell (or other "holding area"). While being held (or "detained"), the prisoner may use the prison's telephony system to attempt to place a telephone call. In doing so, the prisoner dials the billed telephone number (BTN) of the $3^{rd}$-party to whom the prisoner desires to call, and that BTN is captured by a validation platform, which performs certain processing to determine whether the call should be completed. Such validation may include determination of whether the BTN is a number to which calls by the inmate are not permitted (e.g., whether the $3^{rd}$-party whom the inmate is attempting to call is a victim of a crime committed by the inmate, a judge, etc.), determination of a risk score for the inmate and/or called party, determination (e.g., based on the determined risk score) of an appropriate and/or preferable $3^{rd}$-party payment account type (e.g., LEC billing, direct billing, prepaid account, etc.), establishment of such a $3^{rd}$-party payment account types, etc. This validation process may be undesirably lengthy, sometimes taking anywhere from 15 minutes to 24 hours before the desired telephony service can be rendered to the inmate. Upon an inmate being booked into a prison facility, reducing the time delay associated with providing such desired telephony service to the inmate may be desirable to the inmate (e.g., to enable the inmate to more quickly contact $3^{rd}$ parties to arrange bail, etc.), the prison's telephony service provider (e.g., to ensure greater likelihood that the perishable business opportunity will not be missed, and to thus improve revenue opportunities of the service provider), and even to the prison (e.g., to more quickly enable the inmate to arrange bail, etc., so as to reduce the amount of time that the inmate consumes the limited capacity of the prison facility's holding areas, many of which face overcrowding situations).

The inventors of the present application have recognized the above-mentioned desire to facilitate prompt establishment of $3^{rd}$-party payment accounts. For instance, the inventors have recognized that certain business opportunities may be lost if a $3^{rd}$-party payment account is not efficiently established for a resident of a CEF. That is, as described herein, in many instances an opportunity to provide service to a resident of a CEF may be perishable. For instance, in many instances an inmate of a prison facility is detained in such prison facility for a relatively brief time period before being released (e.g., upon a posting of bail, etc.). As another example, while a resident of a CEF (e.g., while incarcerated in a prison), a given perishable event, such as the resident's birthday, the birthday of a loved one (e.g., relative, friend, etc.) of the resident, an anniversary of the resident and/or loved one, etc., may give rise to a perishable opportunity for business. For instance, a desire may arise at or near the time of such an event for the resident to place a telephone call (e.g., to wish a loved one happy birthday or happy anniversary). Thus, in many instances certain business opportunities for service providers who provide services to residents of a CEF are perishable opportunities.

Accordingly, embodiments of the present invention advantageously enable $3^{rd}$-party party payment accounts to be proactively established in anticipation of such perishable opportunities arising, thus affording greater likelihood that the perishable business opportunity will not be lost.

According to certain embodiments, information-capture triggering events are detected, which trigger the capture of information about prospective $3^{rd}$-party payer(s) for a given resident of a CEF. Examples of such information-capture triggering events include a resident being identified as potentially becoming a resident of the CEF (e.g., a person becoming a person under suspicion of a crime and thus identified as potentially becoming an inmate of a prison), the resident being checked into the CEF (e.g., an inmate being booked into a prison facility), and/or other events that may indicate that prospective $3^{rd}$-party payer information may be available for capture for a given resident.

In response to detection of such an information-capture triggering event, information about prospective $3^{rd}$-party payer(s) for the resident is determined. Various such information about prospective $3^{rd}$-party payer(s) may be determined, including identification of the prospective $3^{rd}$-party payer(s) (e.g., their names, etc.), the prospective $3^{rd}$-party payer(s) respective contact information (e.g., telephone number, email address, etc.), and/or other information about the prospective $3^{rd}$-party payer(s). Such information may be determined in any of variety of different ways. As one example, in certain embodiments, information is determined from prior-collected information. For instance, the given resident may be a returning resident of a CEF (e.g., an inmate of a prison facility who has been previously incarcerated in the prison system), wherein $3^{rd}$-party payer information may have been collected for the resident during a previous residency in the CEF. As another example, the resident may interact with a user who enters such prospective $3^{rd}$-party payer information into a computer system. For instance, upon a resident arriving at a CEF, a user may query the resident for information about prospective $3^{rd}$-party payer(s) whom the resident expects may establish $3^{rd}$-party payment accounts for payment for services rendered to the resident while in the CEF. As still another example, the resident (or an associate/representative of such resident, such as a friend or family member of the resident) may interact directly with a computer system to input such prospective $3^{rd}$-party payer information.

Campaign-triggering event(s) may be detected to trigger a campaign in which the identified prospective $3^{rd}$-party payer(s) of a resident are contacted and encouraged to establish a $3^{rd}$-party payment account for the resident. The campaign-triggering event may be the same event that triggered the capture of the prospective $3^{rd}$-party payer information, as mentioned above, or it may be a different event. Examples of such campaign-triggering event(s) include the resident being identified as potentially becoming a resident of the CEF (e.g., a person becoming a person under suspicion of a crime and thus identified as potentially becoming an inmate of a prison), the resident being checked into the CEF (e.g., an inmate being booked into a prison facility), detection of an upcoming perishable date of interest for the resident or an associate (e.g., friend, family member, etc.), such as the resident's or an associate's birthday or anniversary, a holiday, etc., and/or other events that may give rise to prospective $3^{rd}$-party payer(s) desiring to establish $3^{rd}$-party payment accounts for expected service demands of the resident.

In response to detection of the campaign-triggering event(s), the campaign system contacts the prospective $3^{rd}$-party payer(s) and provides such prospective $3^{rd}$-party payer(s) an opportunity to establish $3^{rd}$-party payment accounts for the resident of the CEF. For instance, in certain embodiments, an automatic dialer may be employed to place outbound telephone calls to the identified prospective $3^{rd}$-party payer(s), and an interactive voice response (IVR) unit may be employed to communicate/interact with a called party to encourage the called $3^{rd}$ party to establish a $3^{rd}$-party payment account. Of course, in other embodiments, the identified prospective $3^{rd}$-party payer(s) may be contacted in other ways, such as, via email, etc. Preferably, the campaign (e.g., contacting and communicating/interacting with the $3^{rd}$ parties) is performed autonomously by the campaign system, as opposed to manually by a human user.

In view of the above, embodiments of the present invention enable prospective $3^{rd}$-party payer(s) to be identified for a resident and contacted to enable the prospective $3^{rd}$-party payer(s) to proactively establish $3^{rd}$-party payment accounts in anticipation of a future demand for service from the resident. Thus, when the resident makes a future demand for service, such service may be readily provided in an efficient manner for the resident if a $3^{rd}$-party payment account has been pre-established for the requested service.

It should be recognized that the resident of the CEF, as used herein, may refer to a current resident of the CEF or a future resident of the CEF (e.g., an expected or anticipated resident, such as a person under suspicion and/or being booked into a prison facility). Thus, when reference is made to capturing information about prospective $3^{rd}$ party payer(s) and/or establishing $3^{rd}$-party payment accounts for a resident of a CEF, such tasks may, in some embodiments, be performed at a time prior to the resident actually becoming a resident of the CEF.

According to one exemplary embodiment, a system is provided that includes a $3^{rd}$-party payer identification system, a campaign system, and a service provision system. The $3^{rd}$-party payer identification system may include elements operable to detect the above-mentioned information-capture triggering event(s) and/or to determine the above-mentioned information about prospective $3^{rd}$-party payer(s) for a resident of a CEF. The campaign system may include elements operable to detect the above-mentioned campaign-triggering event(s), and in response to such detection proactively contact the identified prospective $3^{rd}$-party payer(s) to encourage them to establish $3^{rd}$-party payment accounts. Such campaign system may further include elements operable to interact with a contacted prospective $3^{rd}$-party payer to enable the $3^{rd}$-party payer to proactively establish a $3^{rd}$-party payment account. The service provision system may include elements operable to manage the rendering of service, such as telephony service, to a resident of a CEF. Thus, upon a resident of a CEF demanding service, the service provision system may manage the provision of such service to the resident, which may include determining that such service may be paid from a proactively-established $3^{rd}$-party payment account.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
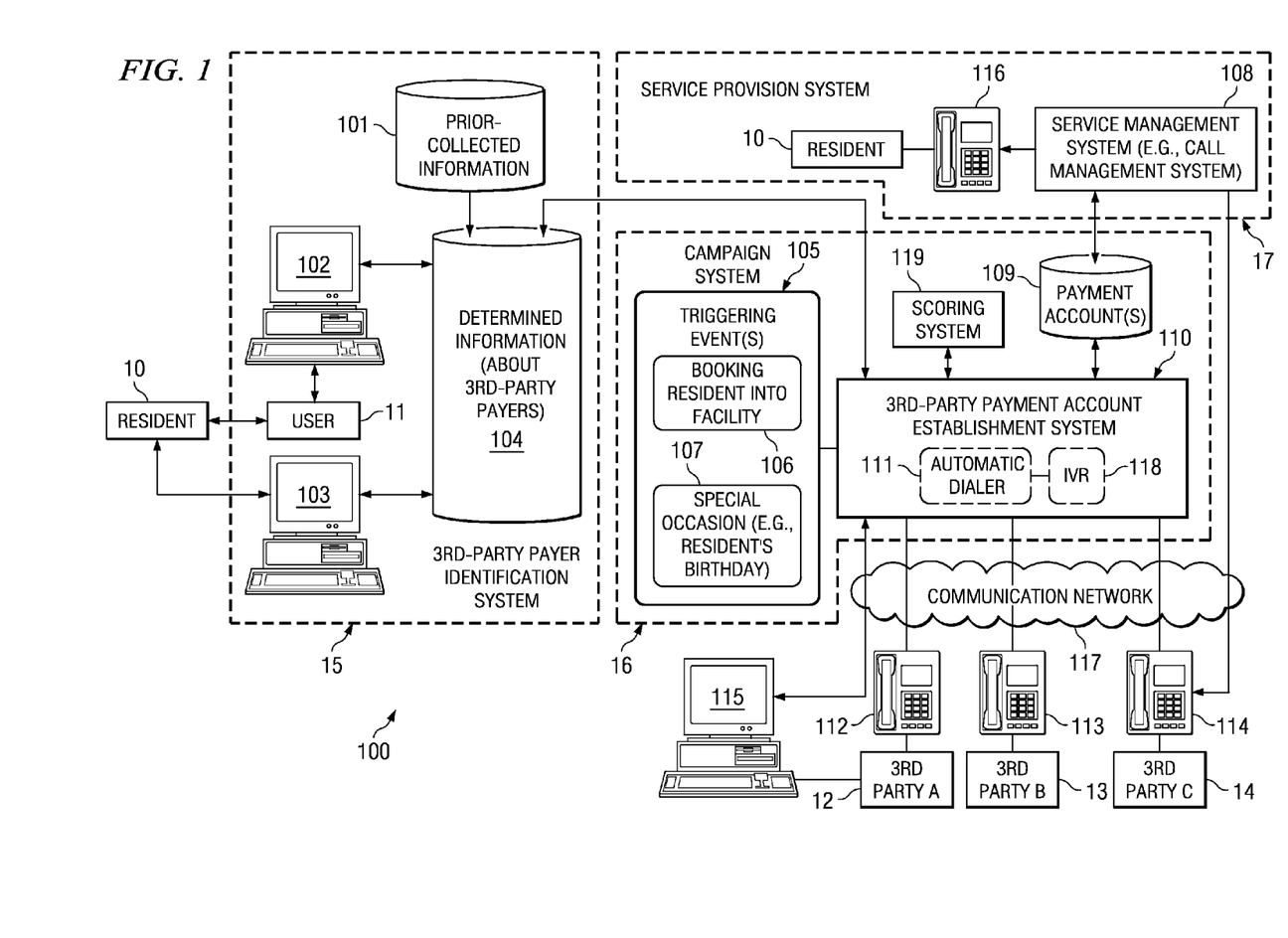
FIG. 1 shows an exemplary system according to one embodiment of the present invention.

FIG. 1 shows an exemplary system 100 according to one embodiment of the present invention. System 100 enables prospective third-party ($3^{rd}$-party) payers (e.g., $3^{rd}$-parties 12, 13, and/or 14) for a resident 10 of a controlled-environment facility ("CEF") to be identified, and enables $3^{rd}$-party payment accounts 109 to be proactively established for such resident 10. Thus, according to this embodiment, $3^{rd}$-party payment accounts 109 can be advantageously established prior to resident 10 demanding a service for which payment is required. Once established, the $3^{rd}$-party payment accounts 109 can be used for payment for services rendered to resident 10 within the CEF.

As one example, the established $3^{rd}$-party payment accounts 109 can be used for payment for telephony services rendered to the resident 10 within the CEF. While embodiments of the present invention have particular application for use in establishing $3^{rd}$-party payment accounts 109 for payment for telephony services rendered to resident 10 of a CEF, the concepts presented herein are not limited to such application. For instance, certain embodiments may be additionally or alternatively applied for use in establishing $3^{rd}$-party payment accounts 109 for payment for other services rendered to resident 10 of a CEF, such as other communication services (e.g., email services, fax services, videoconferencing services, voicemail services, etc.), information retrieval services (e.g., Internet browsing services, etc.), provision of consumer goods (e.g., commissary items), etc. Indeed, embodiments of the present invention may be employed for establishing $3^{rd}$-party payment accounts 109 which may be used for payment for any type of service rendered to resident 10 within CEF that requires payment. Of course, in certain embodiments, the established $3^{rd}$-party payment account 109 for a given $3^{rd}$-party may be restricted for use in paying for only certain types of services rendered to resident 10, such as for payment for communication services (e.g., telephone calls) between the resident 10 and such given $3^{rd}$-party.

Exemplary system 100 includes $3^{rd}$-party payer identification system 15, campaign system 16, and service provision system 17, which are discussed further below. While shown as separate elements in system 100 for ease of discussion, it should be understood that in certain embodiments one or more of the $3^{rd}$-party payer identification system 15, campaign system 16, and service provision system 17 (or portions thereof) may be integrated. Further, the $3^{rd}$-party payer identification system 15, campaign system 16, and service provision system 17 (or portions thereof) may be distributed and communicatively coupled together via a communication network, such as a local area network (LAN), the Internet or other wide area network (WAN), a wireless network, public-switched telephony network, any combination of the aforementioned and/or any other communication network now known or later developed that enables two or more computing devices to communicate. Further still, it will be appreciated from the further description herein that the exemplary components of $3^{rd}$-party payer identification system 15, campaign system 16, and service provision system 17 in FIG. 1 are merely illustrative, and in certain embodiments one or more of the systems 15, 16, and 17 may not include the exemplary components shown, may include different components, and/or may include additional components to support further functionality.

In this example, $3^{rd}$-party payer identification system 15 is operable to identify prospective $3^{rd}$-party payer(s) for a resident 10 of a CEF, such as $3^{rd}$-parties 12-14. As described further herein, such $3^{rd}$-party payer identification system 15 may determine certain information about identified prospective $3^{rd}$-party payer(s), such as contact information for such identified prospective $3^{rd}$-party payer(s). $3^{rd}$-party payer identification system 15 may store such information 104 identifying prospective $3^{rd}$-party payer(s), as well as determined contact information, etc., about the identified prospective $3^{rd}$-party payer(s), to a computer-readable medium, such as memory, hard drive, peripheral data storage drive, optical data storage (e.g., CD, DVD, etc.), magnetic data storage, tape storage, etc. Information 104 may be stored in the form of any suitable data structure, such as to a database, file, table, etc. Information 104 may include various information about prospective $3^{rd}$-party payer(s) for resident 10, such as the identity (e.g., name) of the prospective $3^{rd}$-party payer(s), and contact information for such prospective $3^{rd}$-party payer(s) (e.g., address, telephone number, email address, etc.).

$3^{rd}$-party payer identification system 15 may determine information 104 through one or more of a variety of ways. As one example, in certain embodiments, information 104 is determined from prior-collected information 101, which may be stored to a computer-readable medium in the form of any suitable data structure. For instance, resident 10 may be a returning resident to a CEF, wherein information 101 may have been collected for resident 10 during a previous residency. For example, resident 10 may be a returning inmate of a prison. In today's society, recidivism in prison systems is very common. Of course, prior-collected information 101 may include information previously collected for resident 10 during a given residency in a CEF. For instance, prior-collected information 101 may include information collected upon resident 10 initially being checked into the CEF, and/or information collected over time about resident 10 during the resident's stay at the CEF. For example, upon an inmate being initially booked into a prison, information 101 about prospective $3^{rd}$-party payer(s) for the inmate may be collected. For instance, such information may be collected from the inmate about $3^{rd}$-party payer(s) whom the inmate expects may establish $3^{rd}$-party payment accounts 109 for payment for services rendered to the inmate while incarcerated. As another example, during the inmate's incarceration, information 101 about prospective $3^{rd}$-party payer(s) may be collected based, for instance, on those $3^{rd}$ parties from whom the inmate communicates and/or receives visits and/or correspondence.

In certain embodiments, the $3^{rd}$-party payer information determined for a given resident of a CEF may be accessible for use across a plurality of different CEFs. For example, a plurality of prison facilities may share access to such information. Thus, for instance, prior-collected information 101 and/or other determined information (e.g., information 104) may be communicated to each of the plurality of different CEFs, and/or stored to a data storage medium that is accessible by each of the plurality of different CEFs. In certain embodiments, the various elements of system 100, such as the data storage medium(s) to which prior-collected information 101 and/or determined information 104 are stored and/or other elements of $3^{rd}$-party payer identification system 15, campaign system 16, payment accounts 109, and/or service provision system 17, may be implemented as part of a centralized platform that services a plurality of CEFs, such as the exemplary centralized call processing platform disclosed in co-pending and commonly assigned U.S. patent application Ser. No. 10/642,532 filed Aug. 15, 2003 titled "CENTRALIZED CALL PROCESSING," the disclosure of which is incorporated herein by reference.

Another way in which information 104 may be determined in certain embodiments is by resident 10 interacting with a user 11 who enters such information into a computer system 102 for storage to a computer-readable medium in the form of any suitable data structure. For instance, upon a resident 10 arriving at a CEF, a user 11 may query the resident 10 for information about prospective $3^{rd}$-party payer(s) whom the resident 10 expects may establish $3^{rd}$-party payment accounts 109 for payment for services rendered to the resident 10 while in the CEF. For example, in instances in which resident 10 is an inmate in a prison, user 11 may be an officer who initially books the inmate into the prison, and during such booking may collect information 104 and enter the information into computer system 102.

Another way in which information 104 may be determined in certain embodiments is through resident 10 (or an associate/representative of such resident 10, such as a friend or family member of the resident 10) interacting directly with a computer system 103 to input such information 104 for storage to a computer-readable medium in the form of any suitable data structure. For instance, computer system 103 may be implemented as a kiosk with which resident 10 can interact to supply information 104 about prospective $3^{rd}$-party payer(s). As an example, any of the systems and techniques described in co-pending and commonly assigned U.S. patent application Ser. No. 11/480,259 filed Jun. 30, 2006 titled "SYSTEM AND METHOD FOR ELECTRONIC VISITATION REGISTRATION," (the disclosure of which is incorporated herein by reference) for enabling a user to electronically register for visiting a resident of a CEF may additionally or alternatively be employed for enabling input of prospective $3^{rd}$-party payer information (e.g., by the resident, an associate, and even by the prospective $3^{rd}$-party payer himself). As a further example, any of the systems and techniques described in co-pending and commonly assigned U.S. patent application Ser. No. 11/125,842 filed May 10, 2005 titled "PROCESSOR-BASED SELF-SERVICE TERMINALS USED WITH RESPECT TO CONTROLLED ENVIRONMENT FACILITIES," (the disclosure of which is incorporated herein by reference) may be employed for enabling input of prospective $3^{rd}$-party payer information (e.g., by the resident, an associate, and even by the prospective $3^{rd}$-party payer himself).

Exemplary system 100 also includes campaign system 16, which is operable to communicate with the identified prospective $3^{rd}$-party payer(s) to provide such prospective $3^{rd}$-party payer(s) an opportunity to establish $3^{rd}$-party payment accounts 109 for resident 10. In this example, campaign system 16 includes a $3^{rd}$-party payment account establishment system ("$3^{rd}$-party PAES") 110 that is operable to communicate with an identified prospective $3^{rd}$-party payer and provide such party an opportunity to establish a $3^{rd}$-party payment account 109 for resident 10. For instance, $3^{rd}$-party PAES 110 may use information 104 to determine prospective $3^{rd}$-party payer(s) that are identified for resident 10, as well as their respective contact information, and $3^{rd}$-party PAES 110 may attempt to contact the identified prospective $3^{rd}$-party payer(s) using their respective contact information 104. In certain embodiments, an automatic dialer 11 may be employed to place outbound telephone calls to the identified prospective $3^{rd}$-party payer(s), and an interactive voice response (IVR) unit 118 may be employed to communicate/interact with a called party. Of course, in other embodiments, the identified prospective $3^{rd}$-party payer(s) may be contacted in other ways, such as via email, etc.

Preferably, the campaign (e.g., contacting and communicating/interacting with the $3^{rd}$ parties) is performed autonomously by $3^{rd}$-party PAES 110, as opposed to manually by a human user. Systems for autonomously contacting identified parties and communicating information to such parties (e.g., interacting with the parties) are well known in the art, and any such system now known or later developed may be employed by $3^{rd}$-party PAES 110 in accordance with certain embodiments of the present invention. For instance, automatic dialers 11 that are operable to place outbound telephone calls to identified numbers are known in the art. Further, IVR units 118 that are operable to communicate/interact with a called party are well-known in the art. Of course, in certain embodiments, the called parties may be transferred to a human operator for some or all of the communication/interaction instead of or in addition to using IVR 118 for such communication/interaction.

In the illustrated example of FIG. 1, $3^{rd}$-party PAES 110 determines from information 104 that 3 parties 12, 13, and 14 are prospective $3^{rd}$-party payers for resident 10. $3^{rd}$-party PAES 110 also determines from information 104 contact information, such as telephone numbers, for the identified $3^{rd}$ parties 12, 13, and 14. Automatic dialer 111 initiates a campaign of outbound dialing of the telephone numbers of the identified $3^{rd}$ parties 12, 13, and 14. Such calls are made over a communication network (e.g., the Internet and/or public-switched telephony network) 117 to telephones 112, 113, and 114, respectively. When any such call is answered, IVR 118 may be employed to communicate information to and/or interact with the called $3^{rd}$ party. For example, IVR 118 may communicate information about a triggering event 105 (discussed further below), such as information informing the $3^{rd}$ party that resident 10 is now a resident of a given CEF (e.g., resident 10 is now an inmate of a given prison). Such information about a triggering event may be retrieved by IVR 118 from a data store of information about resident 10, such as information stored to a database that identifies the resident's name, date of check-in (e.g., booking) to the CEF, etc. IVR 118 may also provide the called party an opportunity to establish a $3^{rd}$-party payment account for resident 10 and/or provide instructions to the called party about how to do so. In certain embodiments, the called party can interact with the IVR 118 (e.g., via speaking and/or touch-tone signals) to establish a $3^{rd}$-party payment account 109. For instance, such a $3^{rd}$-party payment account 109 may be a pre-funded account, wherein the called $3^{rd}$ party may interact with IVR 118 to authorize funding such account from funds of the $3^{rd}$ party (e.g., via the $3^{rd}$ party's bank account, credit card account, etc.).

In certain embodiments, a scoring system 119 may be included for use in determining a "risk score" for a $3^{rd}$ party payer. Such risk score may be based on a variety of factors, such as the $3^{rd}$-party payer's credit score, payment history of the $3^{rd}$-party payer, the particular LEC used by the $3^{rd}$-party payer, the status of the resident for which the $3^{rd}$-party payer is paying for services (e.g., whether the resident is a long-term or a short-term resident of the CEF), etc. Exemplary systems and techniques for determining such a risk score are described in co-pending U.S. patent application Ser. No. 11/480,264 titled "SYSTEMS AND METHODS FOR ACCOUNT ESTABLISHMENT AND TRANSACTION MANAGEMENT" filed Jun. 30, 2006, which is a continuation-in-part of co-pending U.S. patent application Ser. No. 11/386,032 titled "SYSTEMS AND METHODS FOR ACCOUNT MANAGEMENT USING INTERRUPT MESSAGE" filed Mar. 21, 2006, which is a continuation-in-part of co-pending U.S. patent application Ser. No. 10/360,248 titled "SYSTEMS AND METHODS FOR ACCOUNT ESTABLISHMENT AND TRANSACTION MANAGEMENT USING INTERRUPT MESSAGING" filed Feb. 7, 2003, and/or as described in co-pending and commonly assigned U.S. patent application Ser. No. 10/360,442 filed Feb. 7, 2003 titled "SYSTEMS AND METHODS FOR TRANSACTION AUTHORIZATION DETERMINATION;" Ser. No. 11/386, 056 filed Mar. 21, 2006 titled "MANAGEMENT OF PROVISION OF SERVICES BASED AT LEAST IN PART ON INFORMATION ABOUT A PAYOR'S UTILITY," the disclosures of which are incorporated herein by reference.

In certain embodiments, an incentive may be offered to a $3^{rd}$ party to proactively establish a $3^{rd}$-party payment account. For instance, various incentives may be employed to encourage a contacted prospective $3^{rd}$-party payer to proactively establish a $3^{rd}$-party payment account for the resident. In certain embodiments, a preferred account type may be determined (e.g., based at least in part on the $3^{rd}$ party's risk score) and an incentive may be offered to the $3^{rd}$ party to encourage the $3^{rd}$ party to establish such preferred account type, rather than some other account type. In certain embodiments, an incentive may be offered to the $3^{rd}$ party to proactively establish a $3^{rd}$-party payment account, wherein the $3^{rd}$ party is informed that such incentive will not be available if the $3^{rd}$ party waits until a later time to establish the $3^{rd}$-party payment account. Such incentives may, therefore, be used to encourage the $3^{rd}$ party to proactively establish a $3^{rd}$-party payment account, which will advantageously reduce delays otherwise associated with the provision of service to the resident at the time the resident demands such service.

In other embodiments, the $3^{rd}$ party may receive information and/or instructions from IVR 118 about how to establish a $3^{rd}$-party payment account 109. For instance, IVR 118 may communicate information about a triggering event 105 (discussed further below), such as information informing the $3^{rd}$ party that resident 10 is now a resident of a given CEF (e.g., resident 10 is now an inmate of a given prison). IVR 118 may also provide the called party instructions about how to establish a $3^{rd}$-party payment account for resident 10. For example, IVR 118 may communicate a website (or other computer-accessible address) to the $3^{rd}$ party, which the $3^{rd}$ party may use to establish a payment account 109. For instance, in the example of FIG. 1, an address (e.g., website) for accessing $3^{rd}$-party PAES 110 is communicated by IVR 118 to $3^{rd}$ party 12, wherein $3^{rd}$ party 12 then uses a computer 115 to access such $3^{rd}$-party PAES 110 (e.g., via the Internet) in order to establish a payment account 109. In this manner, the $3^{rd}$ party 12 may input via computer 115 various information for establishing a funding a pre-funded account, for example.

As mentioned above, such communication with a $3^{rd}$ party may be performed in a manner other than telephony communication, such as via email, etc. Automatic email systems that are operable to generate outbound emails containing information to determined email addresses are known in the art, and such automatic email systems may be employed in certain embodiments to contact prospective $3^{rd}$-party payer(s) with information (e.g., that resident 10 is now a resident of a CEF, such as an inmate of a certain prison, and instructions regarding how to establish a $3^{rd}$-party payment account 109, such as by contacting $3^{rd}$-party payment account establish system 110 via telephone or via computer (such as computer 115), as examples) in a manner similar to that discussed above for the exemplary telephony communication. Thus, while FIG. 1 shows an example in which campaign system 16 employs a telephony campaign for calling prospective $3^{rd}$-party payers 12, 13, and 14, in other embodiments other types of campaigns (e.g., email campaign, etc.) may be employed in addition to or instead of such telephony campaign.

In certain embodiments, triggering event(s) 105 are defined, which trigger campaign system 16 to initiate a campaign to contact identified prospective $3^{rd}$-party payer(s) and encourage such $3^{rd}$-party payer(s) to proactively establish a $3^{rd}$-party payment account in anticipation of an expected upcoming demand for service by a resident of the CEF. In certain embodiments, a system administrator may define the triggering event(s) 105 as desired. For instance, in certain embodiments, a user interface is provided by campaign system 16, which enables a system administrator to define which triggering event(s) 105 are to trigger a campaign. The campaign-triggering event(s) 105 may be the same event that triggered the capture of the prospective $3^{rd}$-party payer information, as mentioned above, or it may be a different event. Examples of such campaign-triggering event(s) include the resident being identified as potentially becoming a resident of the CEF (e.g., a person becoming a person under suspicion of a crime and thus identified as potentially becoming an inmate of a prison), the resident being checked into the CEF (e.g., an inmate being booked into a prison facility), such as event 106 of FIG. 1, detection of an upcoming perishable date of interest for the resident or an associate (e.g., friend, family member, etc.), such as the resident's or an associate's birthday or anniversary, a holiday, etc., such as event 107 of FIG. 1, and/or other events that may give rise to prospective $3^{rd}$-party payer(s) desiring to establish $3^{rd}$-party payment accounts for expected service demands of the resident.

System 100 further includes a service provision system 17, which is operable to render one or more services to resident 10, wherein such services may be paid for via an established payment account 109. In the illustrated example, telephony services are provided to resident 10, and charges for such telephony services may be paid for via an established payment account 109. Of course, embodiments of the present invention are not limited in application to provision of telephony services, but may be additionally or alternatively applied for use in establishing $3^{rd}$ party payment accounts 109 for payment for other services rendered to resident 10 of a CEF, such as other communication services (e.g., email services, fax services, videoconferencing services, voicemail services, etc.), information retrieval services (e.g., Internet browsing services, etc.), provision of consumer goods (e.g., commissary items), etc. Indeed, embodiments of the present invention may be employed for establishing $3^{rd}$-party payment accounts 109 which may be used for payment for any type of service rendered to resident 10 within CEF that requires payment.

Service provision system 17 includes a service management system 108, which manages the provision of services, such as telephony services, etc., to resident 10. In the illustrated example, resident 10 uses telephone 116 to request a call to $3^{rd}$ party 14. Service management system 108 may perform various operations to determine whether such requested call is to be permitted, including without limitation any one or more of determining whether the call is being placed during acceptable time periods in which residents of the CEF are allowed to place calls, whether the $3^{rd}$ party 14 to which the call is being placed is not restricted from communication by the resident 10 (e.g., that $3^{rd}$ party 14 is not a victim of a crime for which resident 10 is incarcerated in prison, etc.), and/or other operations. One operation that may be performed by service management system 10 is to determine how the call is to be paid for and/or the payment risk associated with completing the call (i.e., the risk of the call not being paid for). Thus, service management system 10 may determine whether a $3^{rd}$-party payment account 109 that can be used for payment for the requested call is established. Thus, for instance, if $3^{rd}$ party 14 has pre-established a payment account 109 (e.g., a pre-funded account) prior to resident 10 requesting the call to such $3^{rd}$ party 14 (e.g., as a result of campaign system 16 contacting the $3^{rd}$ party 14), then such pre-established payment account 109 may be used for payment for the call, and thus service management system 108 may enable the requested call to be connected between resident 10 and $3^{rd}$ party 14.

Figure 2:
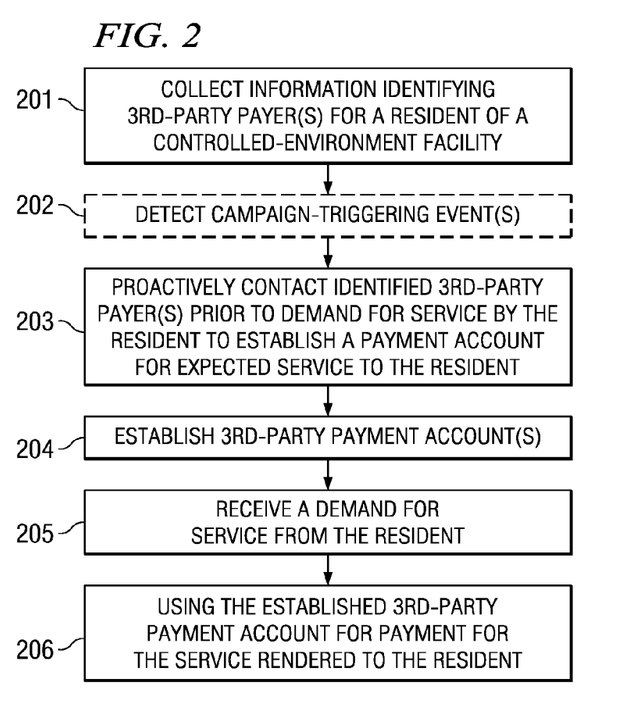
FIG. 2 shows an exemplary operational flow according to one embodiment of the present invention.

Turning now to FIG. 2, an exemplary operational flow according to one embodiment of the present invention is shown. In operational block 201, information 104 identifying $3^{rd}$-party payer(s) for a resident 10 of a CEF is determined (e.g., collected). As mentioned above, such information 104 may be collected from prior-collected information 101 and/or via information received from resident 10 (or an associate or representative of resident 10), such as through interaction with a user 11 who inputs received information to computer 102 and/or interaction by the resident 10 (or an associate or representative of resident 10) with a computer (e.g., kiosk) 103.

In certain embodiments, campaign-triggering event(s), such as the exemplary campaign triggering events 105 discussed above, may be detected in block 202 to trigger a campaign by campaign system 16. In block 203, campaign system 16 proactively contacts identified $3^{rd}$-party payer(s), prior to demand for service by the resident 10, to establish a $3^{rd}$-party payment account 109 for expected service to the resident 10. For instance, in the example illustrated in FIG. 1, campaign system 16 proactively contacts $3^{rd}$ parties 12, 13, and 14 to attempt to establish $3^{rd}$-party payment accounts 109 for resident 10 prior to resident 10 demanding telephony service to call such $3^{rd}$ parties.

In operational block 204, $3^{rd}$-party PAES 110 interacts with the contacted $3^{rd}$-party payer(s) to establish $3^{rd}$-party payment account(s) 109. As mentioned above, in certain embodiments, $3^{rd}$-party PAES 110 may offer incentives and/or otherwise encourage $3^{rd}$-party payer(s) to proactively establish $3^{rd}$-party payment account(s) 109.

In operational block 205, a demand for service is received from resident 10. In the illustrated example of FIG. 1, a demand for telephony service is received by service management system 108 from resident 10. In operational block 206, the service management system 108 uses the proactively-established $3^{rd}$-party payment account 109 for payment for the service (e.g., telephony service) rendered to the resident 10.

Figure 3:
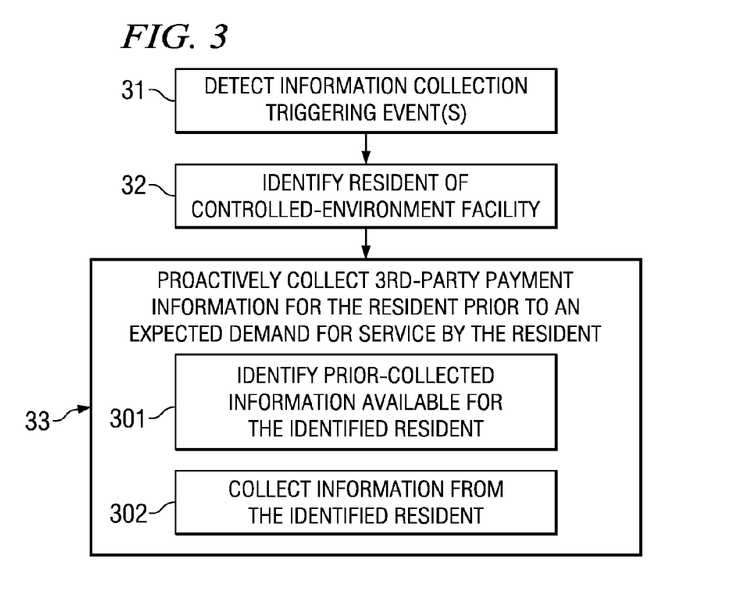
FIG. 3 shows an exemplary operational flow for a $3^{rd}$-party payer identification system according to one embodiment of the present invention.

FIG. 3 shows an exemplary operational flow for $3^{rd}$-party payer identification system 15 according to one embodiment of the present invention. In this example, $3^{rd}$-party payer identification system 15 detects information collection triggering event(s) in operational block 31. That is, in certain embodiments, information-capture triggering events are detected, which trigger the capture of information about prospective $3^{rd}$-party payer(s) for a given resident of a CEF. Examples of such information-capture triggering events include a resident being identified as potentially becoming a resident of the CEF (e.g., a person becoming a person under suspicion of a crime and thus identified as potentially becoming an inmate of a prison), the resident being checked into the CEF (e.g., an inmate being booked into a prison facility), and/or other events that may indicate that prospective $3^{rd}$-party payer information may be available for capture for a given resident.

In operational block 32, resident 10 of a CEF is identified. That is, the resident 10 for whom a campaign is to be initiated is identified. The resident 10 may be identified as being a person identified as potentially becoming a resident of the CEF (e.g., becoming a person under suspicion of a crime and thus identified as potentially becoming an inmate of a prison), a person being checked into the CEF (e.g., an inmate being booked into a prison facility), or otherwise identified.

In operational block 33, $3^{rd}$-party payer identification system 15 proactively collects 3-party payment information 104 for resident 10 prior to an expected demand for service by the resident 10. Such proactive collection of information 104 in block 33 may include identifying prior-collected information 101 that is available for the identified resident 10, as shown in sub-block 301. Additionally or alternatively, such proactive collection of information 104 in block 33 may include collecting information 104 from the identified resident 10 (or an associate or representative of resident 10), as shown in sub-block 302, wherein the information may be collected by a user 11 and input to a computer 102 and/or input by the resident 10 (or an associate or representative of resident 10) to computer 103.

Figure 4:
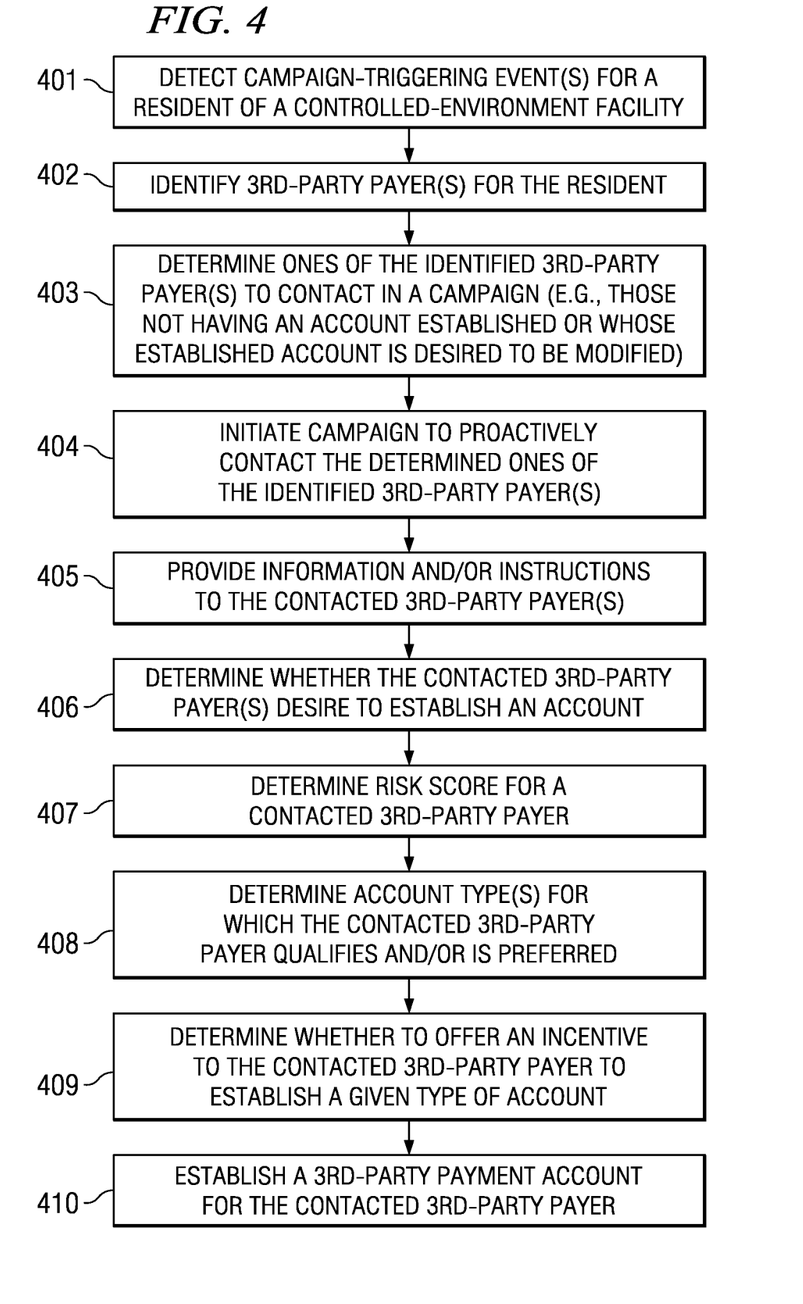
FIG. 4 shows an exemplary operational flow for a campaign system according to one embodiment of the present invention.

FIG. 4 shows an exemplary operational flow for campaign system 16 according to one embodiment of the present invention. In this example, campaign system 16 detects campaign-triggering event(s) 105 for a resident 10 of a CEF in operational block 401. The campaign-triggering event(s) may be the same event that triggered the capture of the prospective $3^{rd}$-party payer information, as mentioned above, or it may be a different event. Examples of such campaign-triggering event(s) include the resident being identified as potentially becoming a resident of the CEF (e.g., a person becoming a person under suspicion of a crime and thus identified as potentially becoming an inmate of a prison), the resident being checked into the CEF (e.g., an inmate being booked into a prison facility), detection of an upcoming perishable date of interest for the resident or an associate (e.g., friend, family member, etc.), such as the resident's or an associate's birthday or anniversary, a holiday, etc., and/or other events that may give rise to prospective $3^{rd}$-party payer(s) desiring to establish $3^{rd}$-party payment accounts for expected service demands of the resident.

In block 402, $3^{rd}$-party PAES 110 identifies (e.g., from determined information 104) prospective $3^{rd}$-party payer(s) for the resident 10, such as $3^{rd}$-party payers 12-14 of FIG. 1. In block 403, $3^{rd}$-party PAES 110 determines ones of the identified prospective $3^{rd}$-party payer(s) to contact in a campaign. For instance, those prospective $3^{rd}$-party payer(s) who have not established an account and/or who have not been contacted recently about establishing an account may be determined as ones to contact in the campaign. As another example, those prospective $3^{rd}$-party payer(s) who have an established payment account 109 that the service provider desires to modify may be determined as ones to contact in the campaign. For instance, certain $3^{rd}$-party payer(s) may have a LEC-billed payment account established, and the service provider may desire (e.g., based on their respective risk scores) to encourage (or require) certain ones of the $3^{rd}$-party payer(s) to establish a pre-funded payment account.

In block 404, $3^{rd}$-party PAES 110 initiates a campaign to proactively contact the determined ones of the identified $3^{rd}$-party payers. For instance, an automatic dialer 111 and IVR 118 may be used for proactively calling the identified $3^{rd}$-party payers 12-14, as shown in the example of FIG. 1. Of course, as mentioned above, such campaign may be conducted via communication instead of or in addition to telephony communication, such as via email communication in certain embodiments.

In block 405, $3^{rd}$-party PAES 110 provides information and/or instructions to the contacted $3^{rd}$-party payer(s). For example, in certain embodiments, an IVR 118 may communicate information about a triggering event 105, such as information informing the $3^{rd}$ party that resident 10 is now a resident of a given CEF (e.g., resident 10 is now an inmate of a given prison). IVR 118 may also provide the called party an opportunity to establish a $3^{rd}$-party payment account for resident 10 and/or provide instructions to the called party about how to do so.

In block 406, $3^{rd}$-party PAES 110 may determine whether the contacted $3^{rd}$-party payer(s) desire to establish an account. For instance, IVR 118 may play a message to a called $3^{rd}$-party payer inquiring whether the called $3^{rd}$-party payer desires to establish a payment account for resident 10. If a response is received in the affirmative, $3^{rd}$-party PAES 110 may thus determine that the called $3^{rd}$-party payer desires to establish such a payment account.

In block 407, $3^{rd}$-party PAES 110 may determine a risk score for a contacted $3^{rd}$-party payer. As mentioned above, such risk score may be determined based on a number of factors, such as the $3^{rd}$-party payer's credit history, etc.

In block 408, $3^{rd}$-party PAES 110 may determine account type(s) for which the contacted $3^{rd}$-party payer qualifies and/or is preferred. As mentioned above, certain $3^{rd}$-party payment account types may be required or preferred by the service provider for a given $3^{rd}$-party payer (e.g., based on the $3^{rd}$-party payer's respective risk score).

In block 409, $3^{rd}$-party PAES 110 determines whether to offer an incentive to the contacted $3^{rd}$-party payer to establish a given type of account. As mentioned above, such an incentive may encourage the $3^{rd}$-party payer to proactively establish a $3^{rd}$-party payment account, and may be employed in certain embodiments to encourage the $3^{rd}$-party payer to proactively establish a preferred type of $3^{rd}$-party payment account.

In block 410, $3^{rd}$-party PAES 110 establishes a $3^{rd}$-party payment account 109 for the contacted $3^{rd}$-party payer for payment for services to be rendered to resident 10 within a CEF. In this manner, the $3^{rd}$-party payment account 109 is proactively established prior to an expected demand for service from a resident of a CEF.

When implemented in software, elements of the present invention are essentially the computer-executable software code for implementing such elements. The computer-executable software code can be stored to a computer-readable medium. The "computer-readable medium" may include any medium that can store information in a manner that can be read from a computing device, such as any processor-based computer. Examples of the computer-readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The exemplary operational flows of FIGS. 2-4 may, for example, be implemented via such software code executable by a processor. Of course, any hardware, software, and/or other logic now known or later developed that may be adapted for performing the operations described herein are intended to be within the scope of the exemplary system elements described.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    identifying at least one prospective third-party payer for a resident of a controlled-environment facility;
    detecting at least one campaign-triggering event; and
    in response to the at least one campaign-triggering event, initiating a campaign to proactively contact the at least one prospective third-party payer prior to demand for service by the resident to encourage the at least one prospective third-party payer to establish a third-party payment account for payment for future service expected for the resident, the at least one prospective third-party payer contacted using an interactive voice response system.

2. The method of claim 1 wherein said initiating said campaign to proactively contact the at least one prospective third-party payer comprises:
    initiating an outbound calling campaign to call the at least one prospective third-party payer.

3. The method of claim 1 wherein the demand for service and the future service expected for the resident comprise at least one selected from the group consisting of:
    communication service, information access service, and provision of consumer goods to the resident.

4. The method of claim 1 wherein the controlled-environment facility comprises a correctional facility.

5. The method of claim 1 wherein said initiating said campaign is performed autonomously by a campaign system.

6. The method of claim 1 wherein said identifying is performed autonomously by a third-party payer identification system.

7. The method of claim 1 further comprising:
    receiving a demand for said future service expected for the resident; and
    paying for the provision of said service rendered to the resident by the third-party payment account.

8. The method of claim 1 wherein said at least one campaign-triggering event comprises an event that is likely to lead to the at least one prospective third-party payer desiring to establish said third-party payment account for payment for future service expected for the resident.

9. The method of claim 1 wherein said at least one campaign-triggering event comprises any one or more of the following:
    the resident being identified as potentially becoming a resident of the controlled-environment facility, the resident being checked into the controlled-environment facility, and detection of an upcoming perishable date of interest for the resident or an associate of the resident.

10. The method of claim 1 wherein the at least one prospective third-party payer is contacted during the campaign via electronic mail, text message or social media.

* * * * *